W. A. HARRIS

ROOFING SHINGLE

Nov. 11, 1930. Re. 17,862

Original Filed Feb. 27, 1925

Inventor
William A. Harris
by Langhorne Brumbaugh & Mey
Attys.

Reissued Nov. 11, 1930

Re. 17,862

UNITED STATES PATENT OFFICE

WILLIAM A. HARRIS, OF NEWTON, MASSACHUSETTS, ASSIGNOR TO FLINTKOTE COMPANY, OF BOSTON, MASSACHUSETTS, A CORPORATION OF MASSACHUSETTS

ROOFING SHINGLE

Original No. 1,732,229, Serial No. 11,965, filed February 27, 1925. Application for reissue filed June 10, 1930. Serial No. 460,242.

This invention has relation to flexible prepared roofing shingles such as produced from a flexible sheet comprising a fibrous foundation of rag or asbestos felt saturated with asphalt or other waterproof bituminous composition, coated with a layer of relatively high melting point asphalt e. g. blown asphalt, and surfaced with a layer of partially embedded crushed slate or other grit.

An object of the present invention is to produce such shingles in a form by which a large area of roof surface may be covered by shingles requiring a minimum amount of material, by which the lower portions or corners of the shingles may be interlocked with laterally adjacent shingles in a lower row, by which said shingles may be accurately placed and spaced apart on the roof or surface to be covered, by which such shingles may be produced without waste from the initial sheet of roofing material, and by which other advantages are obtained as will subsequently be pointed out.

While shingles embodying the present improvement may of course be placed or laid upon a newly built roof structure, they are of especial value in covering previously shingled roofs.

Figure 2:
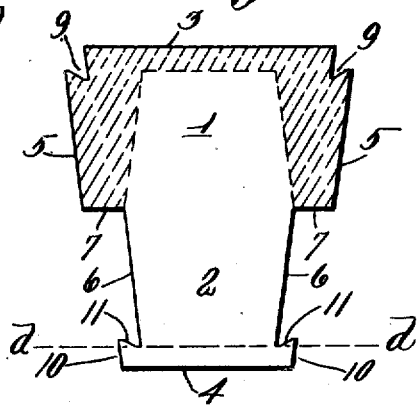
Figure 2 represents one of the shingles.

Each shingle, as shown in Figure 2, may be considered as comprising an upper wide portion or half 1, and a narrower lower portion or half 2, each portion with the exception noted being approximately in the shape of a keystone and they are of equal length longitudinally or lengthwise of the shingle.

Considered as a whole the shingle has straight parallel upper and lower edges 3 and 4.

The upper portion has downwardly converging side edges 5 and the lower portion has also downwardly converging side edges 6, 6 which are respectively within and parallel to the side edges 5, 5. Midway between the upper and lower edges 3, 4 there are shoulders 7, 7 which lie in a transverse median line of the shingle and extend from the upper ends of the side edges 6, 6 to the lower ends of the side edges 5, 5, thus forming corners at the lower portion of the upper half 1, of the shingle. Projecting laterally from the lower corners of the lower portion 2 of the shingle there are tabs or projections 8, 8 and in the upper corners of the upper portion 1, there are recesses 9, 9, which are complemental in size and shape to the tabs 8. The outer or end edges of the tabs 8 may be perpendicular to the under edge 4, but preferably, as indicated at 10, they are parallel to the side edges 6 and 5 on the opposite sides of the shingle, the upper edges of the tabs as indicated at 11 being preferably sloped upwardly and outwardly from the body of the shingle.

Figure 1:
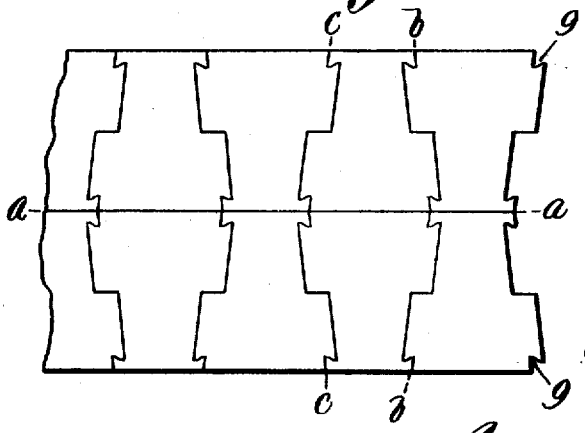
Figure 1 represents how the shingles may be cut or formed from a sheet of roofing material without waste.

In Figure 1, I have shown how these figures may be cut from a sheet of roofing material of the character hereinbefore described without waste. The sheet of the desired width is slit longitudinally into strips by a longitudinal cut indicated at *a—a* so that strip is of a width equal to the desired length of the individual shingle. The shingles are cut transversely of the strips on lines indicated at *b—b* and *c—c*, the lines of severance forming the side edges of the shingles. The wider part of one shingle in a strip lies next to the narrow portion of the succeeding shingle so that they are reversed as to position shown in Figure 1. That portion of a shingle which forms the tabs 8, 8 is produced by cutting the recesses 9, 9 in the adjacent shingles of the strip. By this method of forming the strips there is no waste material. Of course it makes no difference whether the sheet is first slit and then transversely cut or vice versa, or whether the slitting and the transverse cutting are accomplished simultaneously.

Figure 3:
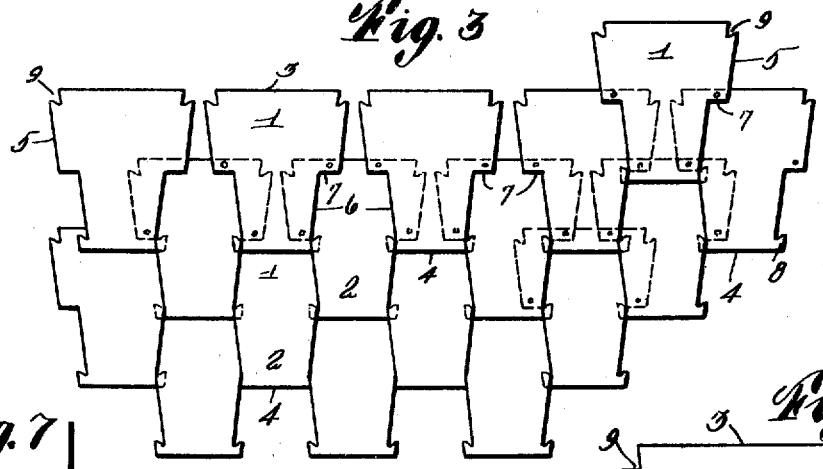
Figure 3 represents the appearance of the shingles when laid interlocked on a roof.

The shingles are laid in overlapping rows upon the roof with the narrow portion of each shingle extending downwardly from the wider portion as shown in Figure 3. The first row of shingles is laid with the shingles spaced apart so that the distance between two shingles at the reentrant corners formed by the shoulders 7 is equal to the width of the lower portion of the shingle measured from the reentrant corners formed by the lateral projections or tabs 8.

When a row of shingles has thus been laid and secured to the roof boards by nails or other fastenings located above the shoulders 7 at points where they will be concealed by overlapping shingles, then the second row of shingles is laid. This is accomplished by inserting the tabs or projections 8 of the shingle under the side edges 6 of two adjacent shingles in the first row, and moving the shingle upwardly until the tabs 8 engage reentrant corners formed by the shoulders 7, or, in other words, until the edges 11 of the tabs engage the shoulders 7. The third row of shingles is similarly laid, each shingle, of course, being similarly nailed. When the roof is completely covered it will present the appearance of a series of hexagonal vertical panels which are longer than they are wide. In Figure 2 I have indicated by dotted and hatched lines that portion of each shingle which is covered by laterally or longitudinally adjacent shingles. Assuming that the length of each shingle is twenty-one inches, that the width of the shingle at its transverse median line is sixteen inches, 100 square feet of roof surface may be covered by shingles having a total area of approximately 175 square feet.

The shingles, of course, may be made wider if desired, and the angularity of the downwardly converging side edges may be made more obtuse so as to vary the shape of the hexagonal panels when the shingles are laid upon the roof.

Figure 7:
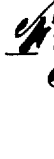
Figure 7 represents a portion of an edge view of such a shingle in which the under folded portion is spaced slightly from the body portion.
Figure 4:
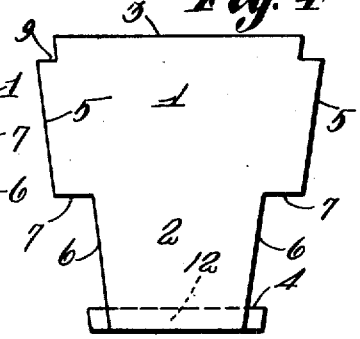
Figure 4 illustrates one of the shingles with its lower interlocking end under folded or bent under the body portion thereof.
Figure 5:
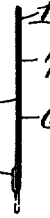
Figure 5 represents a fragmentary edge view of such shingle on a similar scale.
Figure 6:
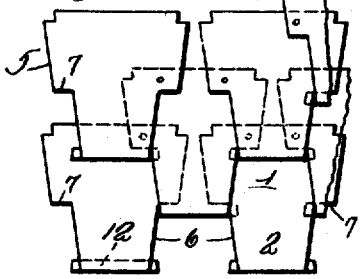
Figure 6 represents the apearance of such shingles when laid and interlocked.
Figure 8:
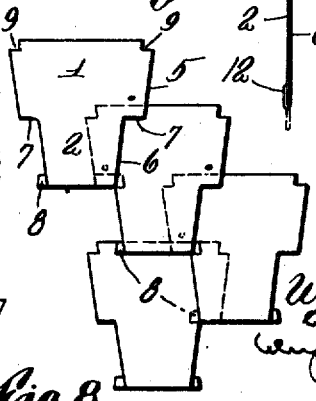
Figure 8 represents how such shingles appear when laid and interlocked.

In some instances I regard it as desirable for the purpose of increasing the thickness of the butt end of the shingle to fold or bend under the body portion thereof on a transverse line *d—d* substantially coinciding with the upper edges 11 of the tabs or projections 8, the folded under flap being indicated at 12 in Figure 5. With this construction the tabs or projections lie in a plane below the plane of the body portion of the shingle and they project beyond the side edges 6 of the lower portion of the shingles. The folded under portion may be cemented to the body of the shingle by asphalt or other suitable adhesive. In laying the shingles shown in Figure 5, the edges 4 of the tabs engage the shoulders 7 of previously laid shingles, as illustrated in Figure 6. The folded under portions, however, may be slightly separated from the body portion of the shingle, as shown in Figure 7, in which event they may be slipped under the shoulders when the shingles are laid as indicated in Figure 8.

From the foregoing description, it will be observed that after the shingles are laid, each shingle is secured by nails which are concealed, and at its lower corners is interlocked with the shingles of the preceding course, and its upper end is overlapped by the shingles of the second row above it. Inasmuch as the asphaltic shingles are flexible, the laterally projecting tabs may easily be bent below the plane of the body of the shingle to lie beneath the laterally adjacent shingles of the next lower row.

I claim:

1. A flexible roofing shingle comprising an upper portion with downwardly converging side edges, and a lower narrower portion of a length equal to that of the upper portion and having downwardly converging side edges, and shoulders substantially midway between the upper and lower edges of said shingles extending laterally outward from the side edges of the lower portion to the side edges of the upper portion, the side edges of said lower portion being parallel and inwardly offset with respect to the respective side edges of the upper portion of said shingle.

2. A flexible roofing shingle comprising an upper portion with downwardly converging side edges, and a lower narrower portion of a length equal to that of the upper portion and having downwardly converging side edges parallel and inwardly offset with respect to the respective side edges of said upper portion, the lower corners of said lower portion having tabs projecting laterally from the side edges thereof, and shoulders substantially midway between the upper and lower edges of said shingles extending laterally outward from the side edges of the lower portion to the side edges of the upper portion, the lower extremity of said lower portion together with said tabs being bent under the body portion thereof.

3. A flexible roofing shingle having parallel ends, the upper portion, which is substantially one half the length of the shingle, being wider than the lower portion, said shingle having lateral shoulders located substantially in the transverse median line thereof, and the lower portion having tabs projecting laterally from the extremity thereof.

4. A flexible roofing shingle having parallel ends, the upper portion of said shingle being wider than the lower portion, said shingle having shoulders substantially on the transverse median line thereof, said lower portion having tabs extending laterally from its lower corners with upper edges sloping upwardly and outwardly from the body of the shingle.

5. A roof comprising shingles laid in overlapping courses, each shingle comprising an upper portion of greater width than the lower portion and having shoulders substantially on the transverse median line thereof, said lower portion having at its lower corners laterally extending tabs with upper edges sloping upwardly and outwardly from the body of the shingle, and interlocking with the shoulders of adjacent shingles.

6. A flexible roofing shingle having parallel ends, the entire contour of one of its side edges being complemental to the contour of the other side edge when reversed end for end and laid side by side therewith, said shingle having shoulders substantially on the transverse median line thereof and tabs extending laterally from the lower corners thereof.

In testimony whereof I have affixed my signature.

WILLIAM A. HARRIS.

CERTIFICATE OF CORRECTION.

Reissue Patent No. 17,862. Granted November 11, 1930, to

WILLIAM A. HARRIS.

It is hereby certified that the above numbered patent was erroneously issued to "Flintkote Company, of Boston, Massachusetts, a corporation of Massachusetts", whereas said patent should have been issued to The Patent and Licensing Corporation, of Boston, Massachusetts, a corporation of Massachusetts, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 9th day of December, A. D. 1930.

M. J. Moore,
Acting Commissioner of Patents.

(Seal)